United States Patent [19]
Dall-Winther

[11] 4,218,183
[45] Aug. 19, 1980

[54] WINDMILL

[76] Inventor: Dennis P. Dall-Winther, R.R. #4, Mason City, Iowa 50401

[21] Appl. No.: 929,254

[22] Filed: Jul. 31, 1978

[51] Int. Cl.³ .................................................. F03D 7/06
[52] U.S. Cl. ........................................ 416/41; 416/119; 416/132 B
[58] Field of Search ............... 416/119, 139 A, 240 A, 416/197 A, 140 R, 142, 37, 41, 42, 132 B, 135 A, 142 B

[56] References Cited

U.S. PATENT DOCUMENTS

| | | | |
|---|---|---|---|
| 247 | 4/1799 | Dearborn | 416/119 |
| 19,383 | 2/1858 | Shaw | 416/142 |
| 32,428 | 5/1861 | Maag | 416/17 |
| 105,915 | 8/1870 | Coleman et al. | 416/119 |
| 153,237 | 7/1874 | Candee | 416/41 |
| 215,035 | 5/1879 | Alden | 416/41 |
| 242,211 | 5/1881 | McIlvaine | 416/119 X |
| 428,495 | 5/1890 | Kittinger | 416/142 |
| 593,170 | 11/1897 | White | 416/132 B |
| 842,054 | 1/1907 | Barker | 416/41 |
| 928,097 | 7/1909 | Barker | 416/119 |
| 1,075,060 | 10/1913 | O'Toole | 416/17 |
| 1,266,472 | 5/1918 | Howe | 416/119 X |
| 1,319,766 | 10/1919 | Gracey | 416/132 B X |
| 1,469,064 | 9/1923 | Zucker | 416/197 A |
| 1,626,314 | 4/1927 | Tuckey | 416/140 X |
| 2,107,690 | 2/1938 | Clark | 416/119 X |
| 2,677,344 | 5/1954 | Annis | 416/132 B X |
| 3,897,170 | 7/1975 | Darvishian | 416/119 |
| 4,134,708 | 1/1979 | Brauser et al. | 416/132 B X |

FOREIGN PATENT DOCUMENTS

| | | | |
|---|---|---|---|
| 555175 | 6/1923 | France | 416/119 |
| 745869 | 5/1933 | France | 416/119 |
| 1081481 | 12/1954 | France | 416/119 |
| 244147 | 1/1927 | Italy | 416/119 |
| 18482 | of 1897 | United Kingdom | 416/119 |
| 21503 | of 1904 | United Kingdom | 416/119 |
| 1486338 | 9/1977 | United Kingdom | 416/41 |

Primary Examiner—Everette A. Powell, Jr.
Attorney, Agent, or Firm—Morton S. Adler

[57] ABSTRACT

A multi-vane windmill rotating in a horizontal plane on a vertical shaft includes frame supported fabric type vanes with the frame hingedly attached at one end to support arms to swing closed and catch the wind in one position and to swing open under centrifugal and wind forces in another position when coming into the wind to reduce air resistance. Vanes are releasably attached in part to the frame for support in operating position and otherwise slidably secured thereto so as to release and collapse on the frame under extreme wind pressures when the frame is closed and thus spill the wind. Stops on the support arms provide a limit of movment of the vane frames. A second embodiment of the vanes includes two overlapping sections normally held in overlapped or closed position by yielding means that permit the sections to separate under high winds to provide an air passageway through the vane.

7 Claims, 10 Drawing Figures

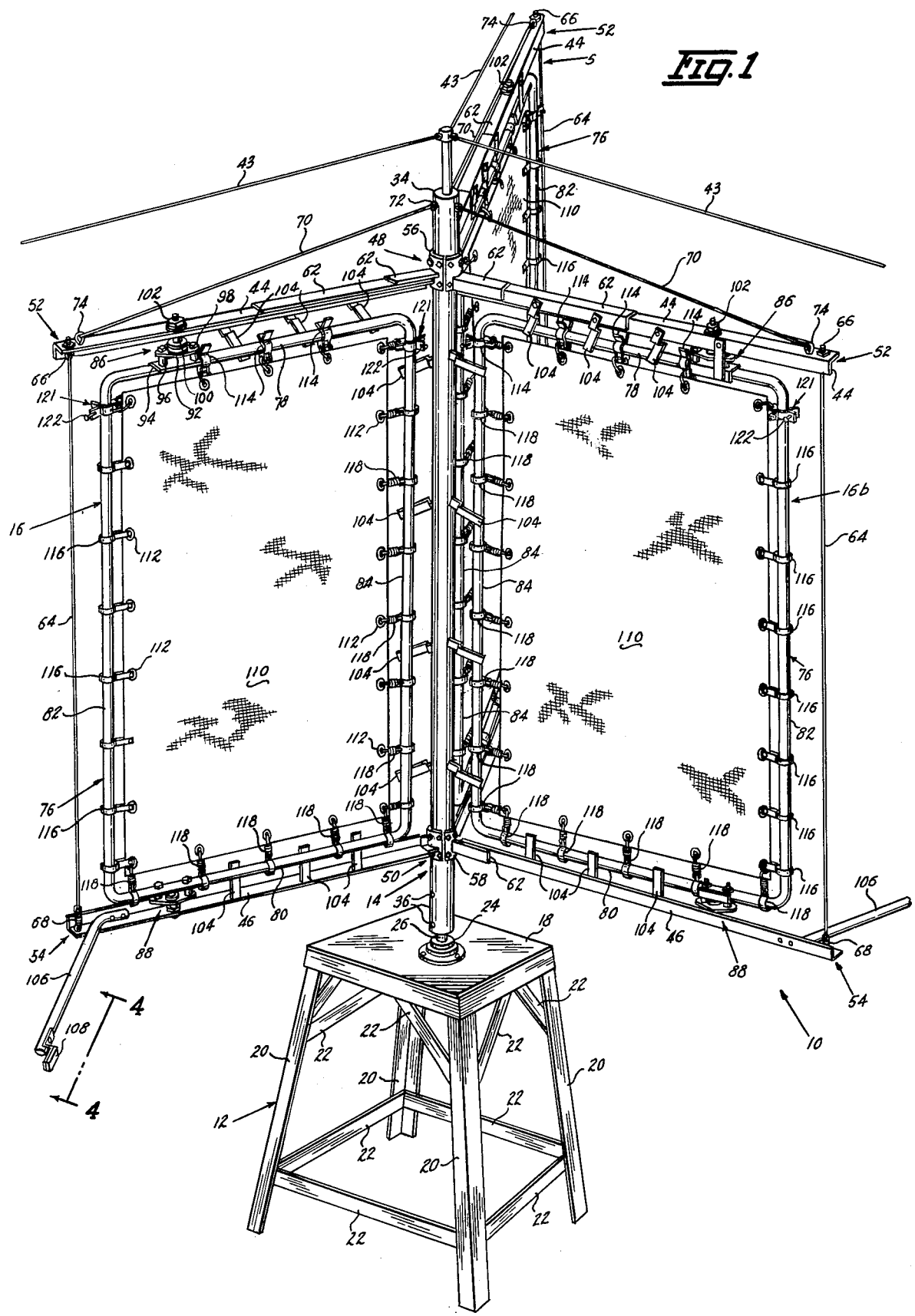

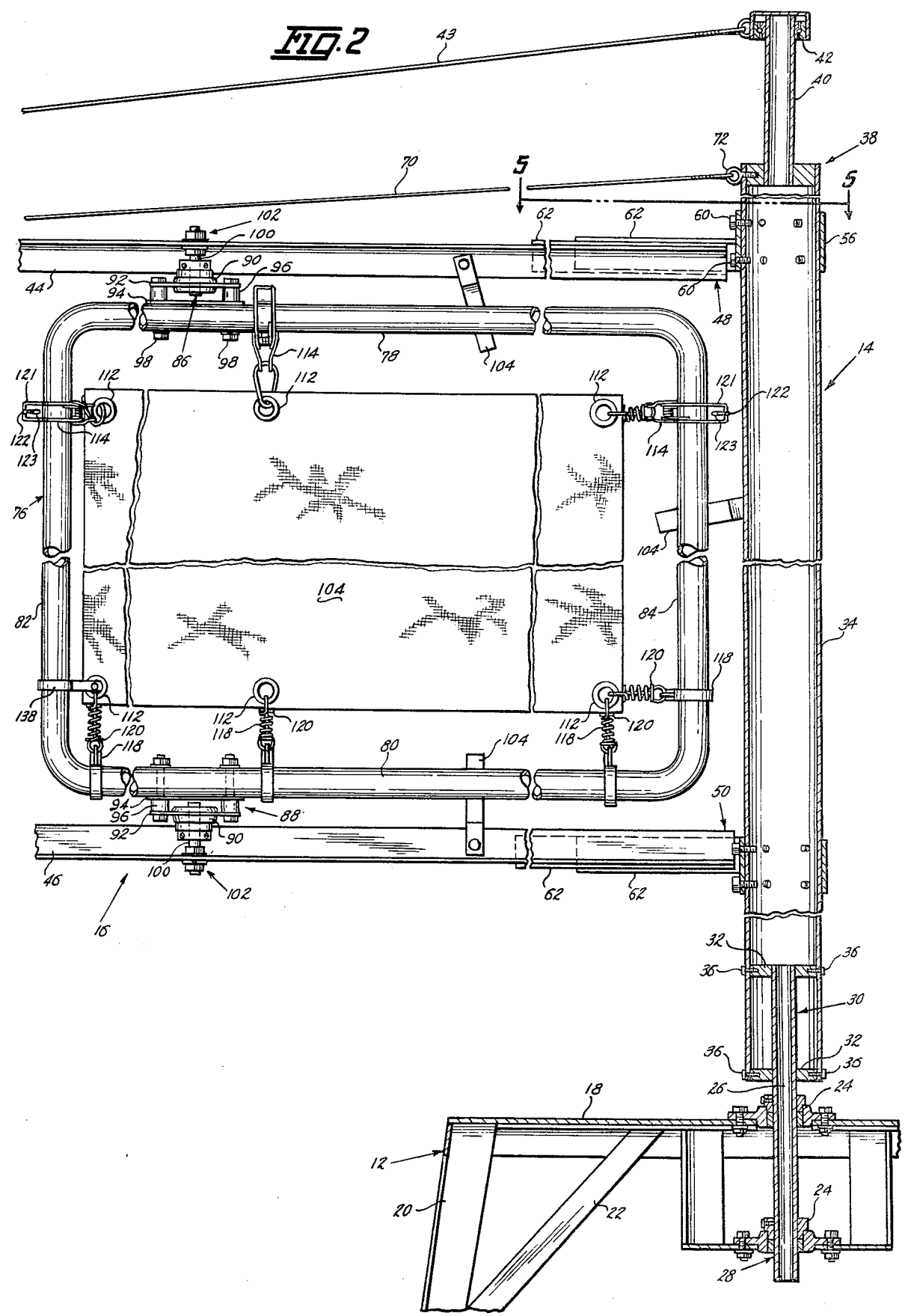

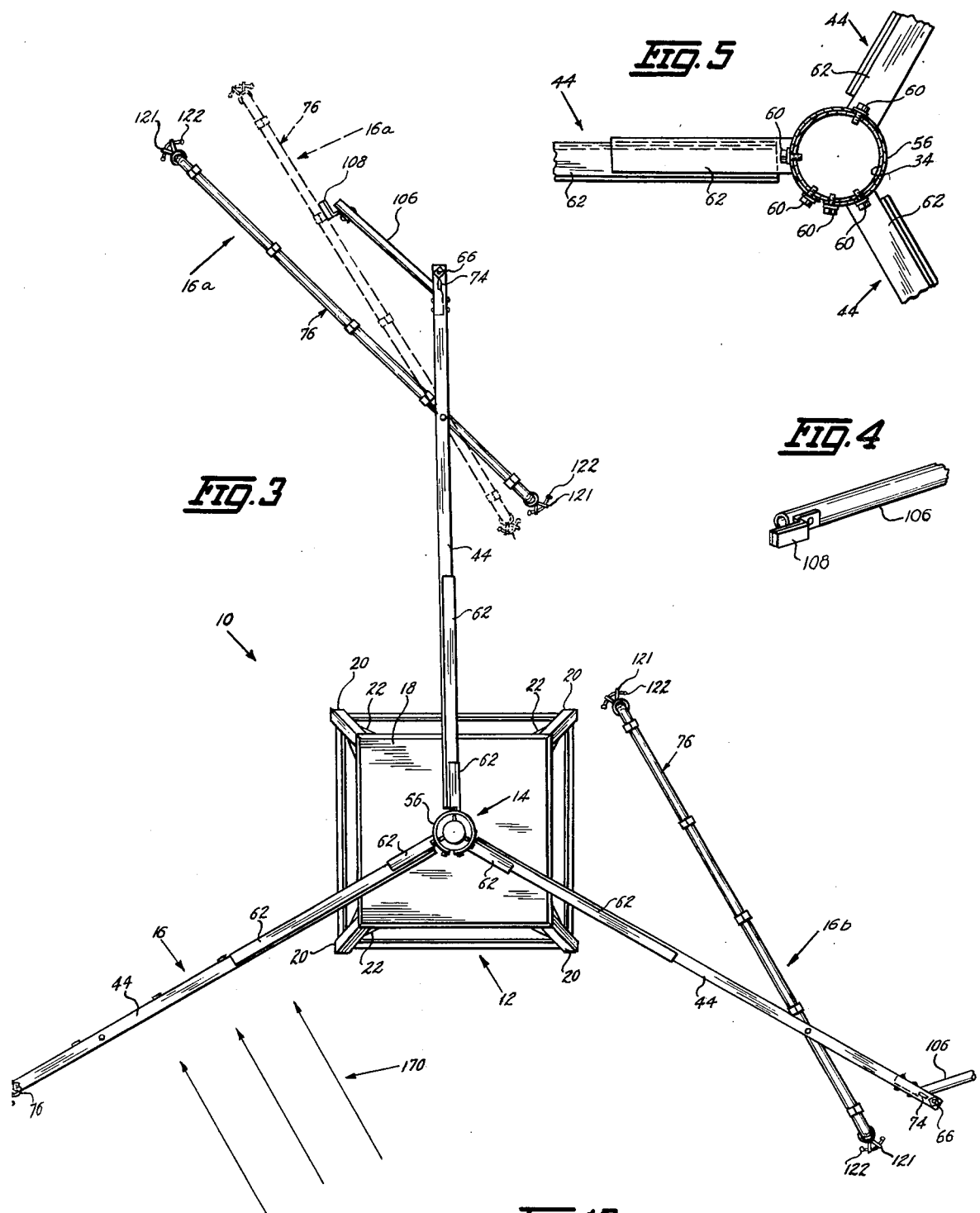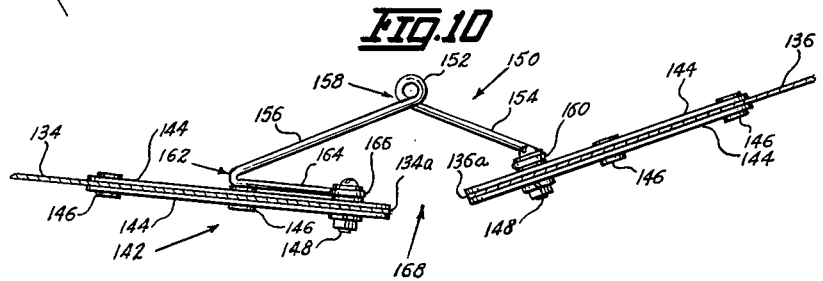

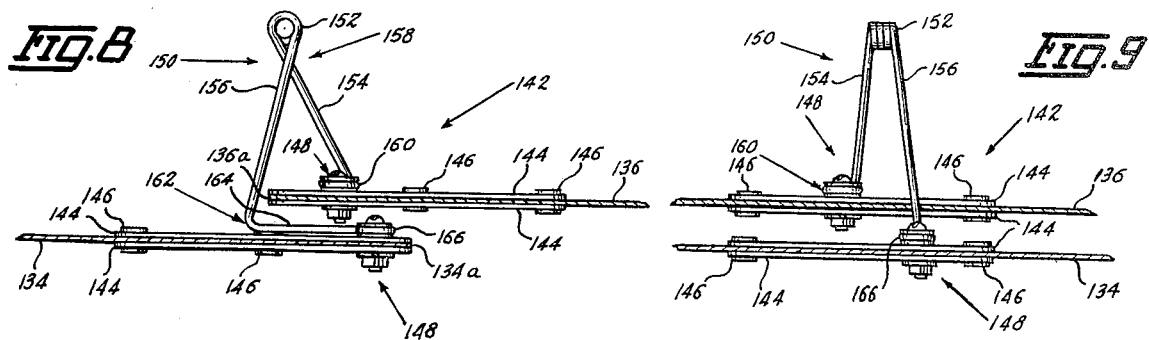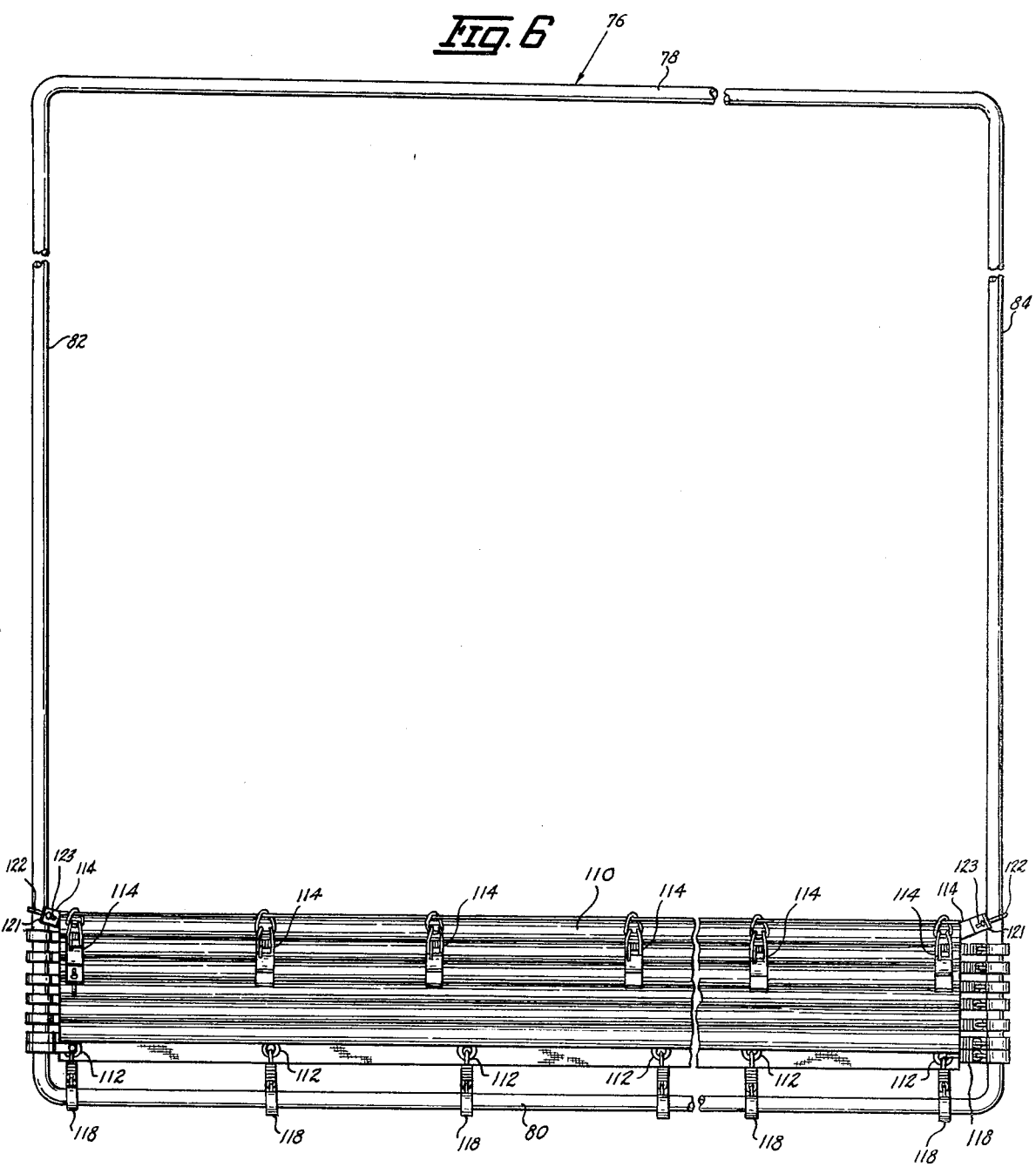

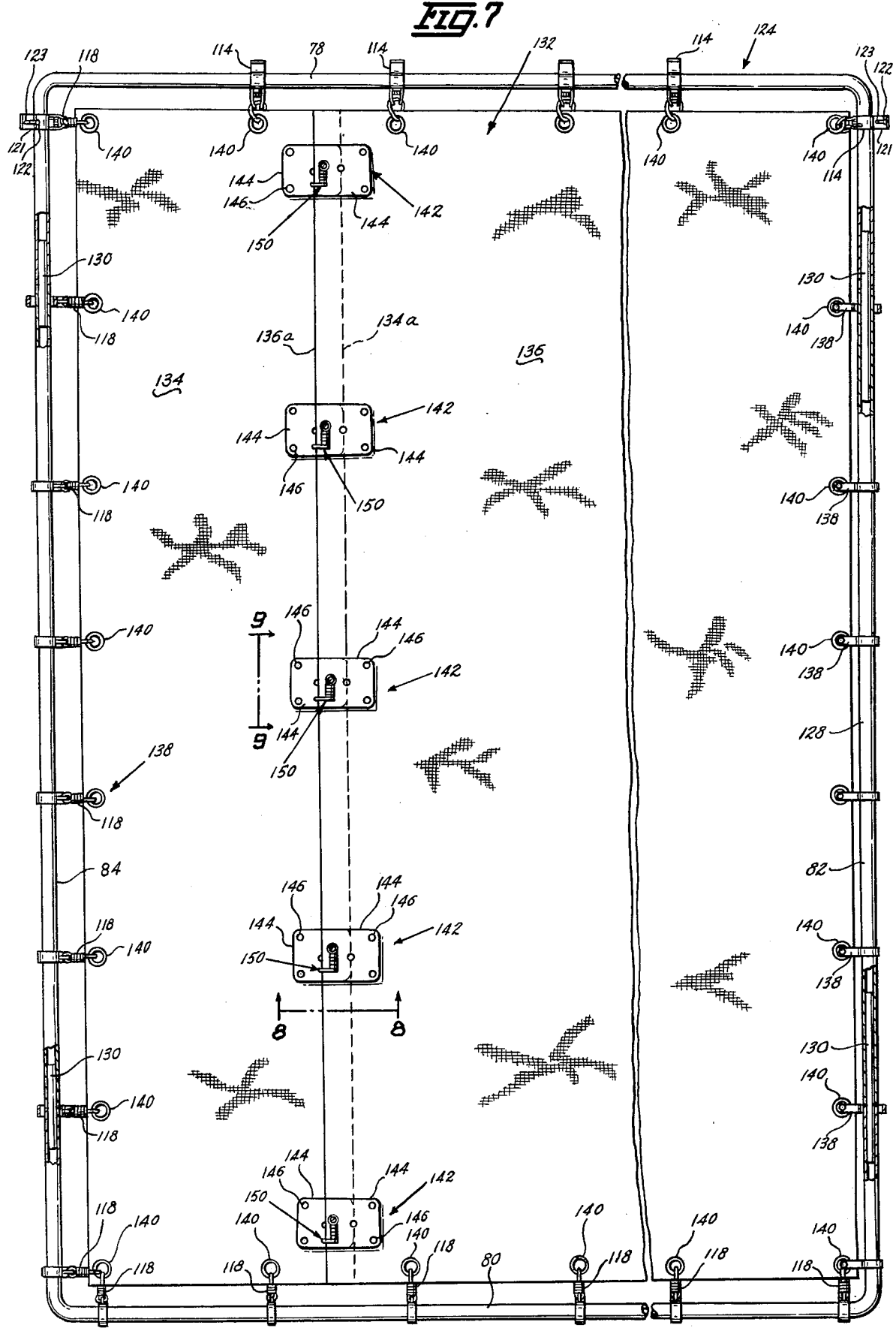

WINDMILL

BACKGROUND OF THE INVENTION

This invention relates to improvements in windmills and more particularly to windmills of the class that include a plurality of vanes rotating in a horizontal plane on a vertical shaft.

The windmill disclosed herein utilizes the well known expedient of vanes that swing closed when in the wind and swing open when coming into the wind and provides certain improvements to increase the efficiency, utility and stability of such devices.

In prior devices of this class, vanes have been made of rigid material such as sheet metal or the like and also of fabric material with both types being securely fixed to a supporting structure in their various positions of operation.

With the above observations in mind, one of the important objects of this invention is to provide a construction for improved operation and utility in a multi-vane windmill of the type rotating in a horizontal plane on a vertical shaft.

Another object of this invention is to provide a windmill structure of the class characterized that includes frame supported vanes which swing closed when in the wind to utilize the wind forces and swing open when coming into the wind to reduce wind resistance and also include means for reducing the wind catching capability of the vane under extreme wind forces and thus automatically prevents excessive speeds and reduces stresses.

More particularly, it is an object of this invention to provide a windmill of the above class which includes fabric vanes within a vertical frame and normally held taut therein by attaching means capable of sliding relative to the frame sides and releasably secured to the top of the frame so that under extreme wind forces, the vanes become disengaged from the top of the frame and collapse toward the bottom thereof to reduce the vane area available for catching the wind.

A further object herein is to provide a second embodiment of vane construction for a windmill as characterized which includes a two piece overlapping vane secured taut within a suitable frame and normally held in overlapped or closed position by yielding means that permit the pieces to separate under high winds to provide an air passageway through the vane and thus reduce speed and stresses.

A still further object herein is to provide an improved stop for limiting the swinging movement of the vane frame to assure effectiveness in efficiently utilizing the wind forces.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view of my improved windmill,

FIG. 2 is a foreshortened side elevational view of one of the like vane assemblies and showing the vane support shaft and base in section, FIG. 3 is a top plan view showing varying vane positions relative to their respective positions in relation to the direction of the wind indicated by arrows, FIG. 4 is a fragmentary perspective view of a vane stop member taken from the line 4—4 of FIG. 1, FIG. 5 is a cross sectional view taken on the line 5—5 of FIG. 2, FIG. 6 is a foreshortened elevational view of the vane seen in FIGS. 1 and 2 but in collapsed position after release from attachment to the upper portion of the vane support frame, FIG. 7 is a side elevational view, foreshortened as to width, of a second embodiment of vane construction for use with this invention, FIG. 8 is an end view of the spring in closed position used with the two piece vane of FIG. 7 taken from the line 8—8 of FIG. 7, FIG. 9 is a side elevational view of the spring in FIG. 8 taken from the line 9—9 of FIG. 7, and FIG. 10 is an elevational view of the spring in FIGS. 8 and 9 but shown in open position.

DESCRIPTION OF THE PREFERRED EMBODIMENTS

Referring to the drawings, this improved windmill is designated generally by the numeral 10 as best seen in FIG. 1 and includes generally a supporting base 12, a vertical shaft assembly 14 carried by base 12 and a plurality of like constructed and equally spaced vane assemblies designated 16, 16a, 16b for later description and arranged on shaft assembly 14 as will later appear.

Base 12 may be of any suitable construction and is shown preferably in the form of an elevated platform surface 18 supported by legs 20 with appropriate bracing 22. Platform 18 is provided with a suitable bearing 24 in which the vertical shaft assembly 14 is rotatably journalled. Such assembly 14 comprises a relative short shaft 26 journalled through bearing 24 so that its lower end portion 28 extends below platform 18 as seen in FIG. 2 and to which any suitable means such as gearing or pulleys (not shown) may be attached in any well known manner for utilizing the rotating forces of such shaft. The upper portion 30 of shaft 26 extends above platform 18 and is provided with the vertically spaced collars 32 to which the lower end of the vane support tubular shaft 34 is secured by means of set screws 36. At the upper end 38 of shaft 34 there is a longitudinal extension in the form of the concentrically reduced shaft 40 secured to end 38 for rotation with shaft 34 and its upper or free end is journalled in bearing 42 to which guy lines 43 are attached (FIG. 1) and extend to suitable ground anchors (not shown) in a well known manner.

Thus far described, shaft 34 is constructed to support a plurality of equally spaced vane assemblies for which I preferably use three as previously designated 16, 16a, 16b and which are of like construction so that the description thereof will be limited to assembly 16 as best seen in FIGS. 1 and 2 with like numerals being given to like parts in assemblies 16a, 16b.

Assembly 16 comprises a pair of vertically spaced parallel horizontal vane frame support arms 44, 46, preferably of aluminum angle material, having the respective inner ends 48, 50 and respective outer ends 52, 54. Arms 44, 46 are disposed in radial relationship to shaft 34 with ends 48, 50 rigidly secured to respective split collars 56, 58 that in turn are secured to respective upper and lower end portions of shaft 34 by set screws 60 as best seen in FIG. 5. Thus arranged, arms 44 on the respective assemblies 16, 16a, 16b are planar as are the arms 46 and the respective vane assemblies are spaced one hundred twenty degrees apart. Arms 44, 46 are reinforced at end portions 48, 50 by the overlapping aluminum strips 62 and ends 52, 54 are connected by a support wire 64 attached to eye bolt 66 at end 52 and spring means 68 at end 54. Arms 44, 46 are further stabilized by the guy wire 70 extending between eye bolt 72 at the upper end of shaft 34 to the eye bolt 74 adjacent arm end 52.

The vane frame 76 is of a generally rectangular shape, preferably of aluminum tubing, and for purposes of description, includes the top bar 78, bottom bar 80, outer side 82 and inner side 84. Frame 76 is disposed between and supported by arms 44, 46 by hinge assemblies 86, 88 on frame bars 78, 80 as best seen in FIG. 2 and also in FIG. 1 where frame 76 is shown in closed position. The size of frame 76 is such that bar 78 is in parallel spaced position below arm 44, bar 80 is similarly position above arm 46, side bar 84 is in parallel spaced relationship to shaft 34 and side bar 82 is similarly positioned inwardly from the support wire 64 between arm ends 52, 54.

Hinges 86, 88 are of like construction so only hinge 86 will be described and like numerals will be given to like parts on hinge 88. Such hinge is located slightly inwardly from the plane of frame side 82 and comprises a bearing 90 in plate 92 attached in spaced relationship to the mounting plate 94 by the spacers 96 and bolts 98 with such bolts also securing plate 94 to the frame bar 78. A pivot pin 100 journalled in bearing 90 is secured to arm 44 by nut and washer means 102. A plurality of spaced frame stop bars 104 are suitably secured to support arms 44, 46 and to shaft 34 as seen in FIG. 1 where stops 104 on arms 44, 46 project angularly from such arms to intersect the plane of movement of the respective frame bars 78, 80 and stops 104 on shaft 34 extend radially therefrom to intersect the path of movement of frame side 84 and abutment of frame 76 with such stops 104 defines the closed frame position. Accordingly, the swinging of the vane frame 76 away from its closed position to open position is towards the viewer in FIG. 1 and a limit stop for frame movement to open position is provided by the tangential rod 106 on arm 46 and end 54. A spring clip 108 at the end of rod 106 cushions the impact from the vane frame if such impact occurs.

The vane 110 is complementary in shape to frame 76 and is preferably of any suitable fabric composition such as parachute material, for example, or the like and is provided with spaced grommets 112 about its several edges in a well known manner. Vane 110 is releasably attached to the top frame bar 78 by releasable snap-on clips 114 of a type that are commercially available and secured to appropriate grommets 112 and is similarly attached to the upper portions of frame sides 82, 84 by clips 114. On frame side 84 below clips 114 and to the bottom bar 80, vane 110 is attached by spring-loaded slidable ring fasteners 118 to assure tautness. Fasteners 118 are provided with a wire stop limit means 120 so they cannot be over-extended. The spaced frame engaging portions 121 of the uppermost snap-on clip 114 on frame sides 82, 84 are provided with a loop keeper 122 engaged through slots 123 in portions 121 and which slidably embrace the respective frame sides 82, 84 as best seen in FIG. 1. By this arrangement, clips 114 are capable of release from frame 76 under extreme wind forces and at the same time, keepers 122 hold vane 110 against uncontrolled flapping in the wind.

Reference is now made to FIGS. 7–10 for a description of a second embodiment of a vane construction. The vane frame 124 is substantially the same as frame 76 but with the respective sides 126, 128 reinforced by spaced internal rod inserts 130. A modified vane, designated generally by the numeral 132, comprises two sections 134, 136 arranged to have overlapping edges 134a, 136a as best seen in FIG. 7 and otherwise, having their respective other three edges secured to frame 124 by appropriate fasteners 138 and grommets 140 of any suitable types such as previously described at 118. It is not material whether edges 134a, 136a overlap in a vertical or horizontal plane.

The overlapping or closed position of vane sections 134, 136 is normally maintained by a plurality of spaced spring tensioned fastening means 142. For this purpose, each edge 134a, 136a at the point of a fastening means 142 is sandwiched between firm reinforcing plates 144 of any suitable material such as plastic, metal or the like and secured to sections 134, 136 as by rivets 146. Like anchor posts 148 shown in the form of a stub bolt, washer and nut unit are secured to the respective plates 144 through the respective vanes 134, 136 at their overlapping portions so as to be in offset alignment when vanes 134, 136 are overlapped or closed as best seen in FIG. 8.

Means for normally but yieldingly holding vanes 134, 136 in closed position comprise the spring member 150 which includes a length of spring rod material bent intermediate its ends into a series of convolutions 152 to form a short arm 154 and a long arm 156 which intersect at point 158 closely adjacent the convolutions 152. Arms 154, 156 diverge from point 158 with arm 154 terminating in an eye loop or hook end 160 and arm 156 extends to bend point 162 beyond the length of hook end 160 of arm 154 and extends from point 162 as at 164 towards and beyond end 160 to terminate in a similar eye loop or hook end 166 spaced from end 160 in offset relationship thereto. With vanes 134, 136 overlapped as best seen in FIG. 8, eye hook 160 is attached to anchor 148 on the outer surface of vane 136 and portion 164 of arm 156 extends between vane ends 134a, 136a where hook end 166 is correspondingly attached to anchor 148 on vane section 136. By this arrangement and with a plurality of fasteners 142 (FIG. 7), vane sections 134, 136 are normally held in closed position but capable of opening to provide an air passageway therethrough 168 as seen in FIG. 10. Thus constructed and arranged as described, this windmill operate as follows.

OPERATION

Windmill 10 as shown will rotate in a clockwise direction and its operation is described relative to wind direction indicated by arrows 170 in FIG. 2.

Vane 16 is shown closed with the frame 76 abutting stops 104 to catch the wind and rotate shaft 34. As vane 16 moves toward the position represented at 16a (FIG. 2), it will swing by centrifugal force on hinges 86, 88 away from arms 44, 46 and stops 104 to spill the wind and normally under wind forces encountered in this position, frame 76 will generally not exceed the solid line position in 16a but if it should move further, its ultimate position is limited by abutment with the spring clip 108 on stop 106 so that it cannot move beyond a point preventing effective return to close position as it moves towards the position of 16b where the described sequence continues to be repeated.

Should the wind speed become extremely high or excessive, the snap-on clips 114 will release permitting the vane 110 to collapse on the frame 76 by reason of the slide rings 116,118 to the position shown in FIG. 6, it being noted that keepers 122 will serve to loosely retain attachment to frame sides 82, 84 and thus keep vane 110 from flapping wildly. By this arrangement, a substantial portion of the area of vane 110 is removed from contact with the wind to automatically prevent any excessive speeds and undue stresses. The same results are accomplished by the second vane embodiment 132 where excessive wind forces will move vane sections 134, 136 from their closed position seen in FIGS. 7 and 8 to their open position shown in FIG. 10 where edges 134a, 136a separate to form the air passageway 168 through the vane to reduce the wind force on the vane. Accordingly, in view of the foregoing, it is thought a full understanding of the construction and operation of this invention will be had and the advantages of the same will be appreciated.

I claim:

1. A windmill comprising:
   a support base,
   a vertical shaft mounted to said base for rotation abouts its longitudinal axis,
   a plurality of pairs of vertically spaced parallel horizontal arms defining respective upper and lower arms each with respective inner and outer ends,
   means securing each pair of arms at respective inner ends to said shaft so as to extend radially therefrom in equidistant relationship about the perimeter of said shaft,
   a respective substantially rectangular open frame disposed between each pair of arms and hingedly secured thereto near said respective outer ends whereby said frame can swing to a closed position of alignment with said arms and to an open position out of alignment with said arms,
   a respective radial stop member on said shaft in alignment with respective pairs of arms and disposed to intersect the path of movement of said respective frames so as to limit said movement in one direction,
   a respective vane having top and bottom ends and releasably secured at said top end to and within the confines of said respective frames, and
   means responsive to extreme wind forces acting on said vanes to effect their release at said top end from said frame whereby said vanes collapse by gravity for reducing the wind catching capability of said vanes when said frame is in closed position.

2. A windmill as defined in claim 1 including:
   a respective elongated stop member secured at one end to the respective outer ends of said respective lower arms and extending tangentially relative thereto,
   said respective stop members disposed to limit the movement of said respective frames to open position, and
   a respective spring clip on the extended end of each stop member to cushion the impact of said frame against said stop member.

3. A windmill as defined in claims 1 or 2 further comprising a plurality of spaced stops on said respective upper and lower arms disposed to cooperate with said radial stop members in limiting the movement of said respective frames in said one direction.

4. A windmill as defined in claims 1 or 2 further comprising:
   respective tensioned wire support means connecting respective outer ends of each respective pair of arms,
   a respective guy line connecting the outer end of each respective upper arm to said shaft, and
   a plurality of guy lines each connected respectively at one end to the upper end of said shaft and adapted at their other ends for attachment to a ground anchor.

5. A windmill comprising:
   a support base,
   a vertical shaft mounted to said base for rotation about its longitudinal axis,
   a plurality of pairs of vertically spaced parallel horizontal arms defining respective upper and lower arms each with respective inner and outer ends,
   means securing each pair of arms at respective inner ends to said shaft so as to extend radially therefrom in equidistant relationship about the perimeter of said shaft,
   a respective substantially rectangular open frame disposed between each pair of arms and hingedly secured thereto near said respective outer ends whereby said frame can swing to a closed position of alignment with said arms and to an open position out of alignment with said arms,
   a plurality of spaced stops on said respective upper and lower arms disposed to intersect the path of movement of said respective frames so as to limit said movement in one direction,
   a respective elongated stop member secured at one end to the respective outer ends of said respective lower arms and extending tangentially relative thereto,
   said respective stop members disposed to limit the movement of said respective frames to open position,
   a respective spring clip on the extended end of each stop member to cushion the impact of said frame against said stop member,
   a respective vane having top and bottom ends and releasably secured at said top end to and within the confines of said respective frames, and
   means responsive to extreme wind forces acting on said vanes to effect their release at said top end from said frame whereby said vanes collapse by gravity for reducing the wind catching capability of said vanes when said frame is in closed position.

6. A windmill as defined in claims 1 or 5 wherein said means for reducing the wind catching capability of said vanes under extreme wind forces further comprises:
   said frame defining respective top, bottom and spaced side members,
   said vane being of foldable material,
   a plurality of respective fastening means secured in spaced relationship about the perimeter of said respective vanes and operably secured to said respective frame members,
   at least some of said fastening means being spring tensioned to maintain said vanes in taut position,
   means on said fastening means attached to said side members of said frames affording a slidable relationship thereto, and
   means on said fastening means which are attached to said top member of said frames for release therefrom under extreme wind forces whereby upon release said vanes will collapse by gravity on said frames toward said bottom member.

7. A windmill as defined in claim 6 further comprising a respective loop keeper operably connecting said vane to the upper portion of said respective side members of said frame in slidable relationship thereto whereby upon release of said vane from attachment to said top member of said frames said keepers serve to restrain said vanes from uncontrolled flapping as it collapses to the bottom member of said frames.

* * * * *